United States Patent [19]
Kennedy et al.

[11] Patent Number: 6,092,640
[45] Date of Patent: Jul. 25, 2000

[54] ARTICLE GRADING APPARATUS

[75] Inventors: Hamish Nigel Alexander Kennedy; Gavin Brian Reeve; Peter Samuel Short; Philip William Poore, all of Auckland, New Zealand

[73] Assignee: Horticultural Automation Limited, Auckland, New Zealand

[21] Appl. No.: 08/904,785

[22] Filed: Aug. 1, 1997

Related U.S. Application Data

[62] Division of application No. 08/464,647, Jul. 27, 1995, Pat. No. 6,003,653.

[30] Foreign Application Priority Data

Dec. 22, 1992 [NZ] New Zealand .............................. 145567

[51] Int. Cl.⁷ .................................................. B65G 37/00
[52] U.S. Cl. ...................... 198/367; 198/370.04; 209/912
[58] Field of Search ............................. 198/367, 370.02, 198/370.04, 779; 209/912

[56] References Cited

U.S. PATENT DOCUMENTS

| | | |
|---|---|---|
| 3,747,755 | 7/1973 | Senturia et al. . |
| 4,262,807 | 4/1981 | Leverett . |
| 4,403,669 | 9/1983 | Raz . |
| 4,426,006 | 1/1984 | Horii et al. . |
| 4,787,498 | 11/1988 | Males et al. . |
| 5,244,100 | 9/1993 | Regier et al. . |
| 5,267,654 | 12/1993 | Leverett . |
| 5,335,767 | 8/1994 | Killer et al. . |
| 5,348,132 | 9/1994 | Maier . |
| 5,626,236 | 5/1997 | Hiebert ................................. 209/912 X |
| 5,878,863 | 3/1999 | Madden et al. ..................... 198/370.04 |

FOREIGN PATENT DOCUMENTS

| | | |
|---|---|---|
| B-3294589 | 9/1989 | Australia . |
| 0 491 407 | 6/1992 | European Pat. Off. . |
| 3303184 | 8/1983 | Germany . |
| 3-106716 | 5/1991 | Japan ...................................... 198/367 |
| 2 197 633 | 5/1988 | United Kingdom . |

OTHER PUBLICATIONS

May 31, 1989, New Zealand Patent Application No. 229363.
Dec. 22, 1987, New Zealand Patent Application No. 223034.
Jun. 29, 1981, New Zealand Patent Application No. 197565.
Sep. 4, 1980, New Zealand Patent Application No. 194845.
Jun. 24, 1992, EP,A,491407–A1 (Abstract), MAF Material Arboriculture Fruitiere.
Feb. 1, 1982, Japan Abstract 57–19221.
Feb. 1, 1982, Japan Abstract 57–19222.
Jun. 29, 1990, Japan Abstract 2–169409.
Dec. 15, 1974, Derwent Abstract Accession No. D8911x/17—SU,A,447328.

*Primary Examiner*—Tuan N. Nguyen
*Attorney, Agent, or Firm*—Merchant and Gould P.C.

[57] ABSTRACT

A plurality of carriers (1) and spaced apart along an endless conveyor in an article grading apparatus. The articles are supported between a roller (2) and a back plate (7). The rollers (2) can be raised and rotated, at which time, superfluous articles supported between the rollers (2) of consecutive carriers will be ejected so that with the lowering of the roller (2), only one or a selected number of the articles remain in a particular carrier (1).

19 Claims, 3 Drawing Sheets

ARTICLE GRADING APPARATUS

This is a Divisional of application Ser. No. 08/464,647, filed Jul. 27, 1995 now U.S. Pat. No. 6,003,653, which application(s) are incorporated herein by reference.

TECHNICAL FIELD

This invention relates to article grading apparatus and in particular, but not solely, to fruit and/or vegetable carrying and tipping apparatus used in the grading and/or packaging of fruit and/or vegetables.

BACKGROUND ART

Fruit graders usually comprise an endless circuit of carriers or "cups" on a conveyor chain with the cups situated to unload fruit at stations appropriate to, for example, fruit weight, size, colour or defect type. There are currently two predominant methods of sizing fruit, being weighing and imaging (using a video image to gain information about the fruit). The weighing method requires that the fruit are separated, that is, one per cup and that the cup be stable with minimum external forces. The imaging method requires that fruit be rotated between large diameter rollers in order that multiple views may be obtained (especially for non-spherically shaped fruit). Many different designs of cup and their actuating systems are known to the prior art.

One type of cup system has been termed a "back-tipping" cup. An example of this cup type is disclosed in U.S. Pat. No. 4,403,669 issued to Raz. A back tipping-cup has an actuating mechanism which allows the fruit in the cup to be dropped backwards, away from the direction the fruit is travelling. This type of system requires that the cup be tipped from horizontal down to almost vertical in order that the produce may be dropped out of the cup. This system also requires a large cup in order that the fruit may fall unimpeded through the gap left by the tipped cup and therefore fewer cups per unit length of conveyor and lower throughput of produce results. The back-tipping method also requires that the produce be dropped from a greater height when compared to some other devices so that the large cup may be swung almost to vertical, increasing damage to the produce.

Another prior art cup system involves side-tipping cups which have a "kicker" or "ejector" incorporated on one side of the cup. An example is disclosed in U.S. Pat. No. 5,029,692 to Warkentin. The "kicker" comprises a lever at one side of the cup, pivoted at the side of the cup which extends to form part of the base of the cup. By pushing down or up on the lever, the produce in the cup may be ejected from the cup. Disadvantages of this system are that depending upon the placement of the fruit within the cup, the action of the kicker can cause fruit to be catapulted from the cup rather than tipped as is the preferred method as well as the kicker resulting in bruising to the fruit. Also, it has been found that the shape of the member which comes in contact with the fruit has caused problems as if it is too small, the produce may be moved to either side of the member without being ejected from the cup. These devices have allowed ejection only to one side of the conveyor thereby limiting the overall performance of the grading system. With one sided ejection, in a case when fruit in consecutive carriers are destined for the same station, the chances are high that a collision could occur, bruising the fruit.

A further device comprises a variation to the mechanism of the previously mentioned back-tipping system where the produce is dropped to one side of the cup. This one sided limitation as has been previously mentioned reduces the overall performance of the system as only one side of the conveyor chain is being utilised to, for example, accept fruit for packaging.

In our U.S. patent application No. 08/464,647, there is described and claimed an article support means for an endless conveyor article grading apparatus, said support means comprising article receptable means and mounting means, said mounting means normally mounting said article receptable means so that it is in a substantially horizontal plane but upon the application of an external force will allow the article receptacle means to fall to either side of the mounting means to thereby discharge any article held therein depending on to which side of the article receptacle means said force is applied.

The accuracy of weight measurements in many prior art cups has also been of concern. While it is possible to have a video camera image of a piece of fruit used to estimate the weight of substantially round produce, irregular shaped produce must be rotated to obtain more shape information. Other systems use load cells with an arrangement whereby the cups are passed over the sensor to cause a voltage impulse waveform, indicative of the weight of the fruit, to be output by the load cell. In order to accurately determine the weight of the fruit it is necessary to allow sufficient time to pass between adjacent cups so that the individual impulses are recognisable and that the cup mechanism is capable of allowing the fruit to be weighed without the added effects of the conveyor belt system. These added effects include vibration from the system operation and the weight of the cup and conveyor system being mistakenly combined with the fruit weight.

Some prior art conveyor systems require a length of rollers to be fitted at the beginning of the chain to be used as a "singulator" whereby a process is undertaken which attempts to ensure that only one piece of fruit is placed in each grading cup. An example is disclosed in U.S. Pat. No. 3,627,127 to Whiteford. This process may set a slow speed for the system in addition to requiring that the number of cups and the length of the conveyor system be extended.

It is, therefore, an object of the present invention to provide an article support means for an article grader which goes some way towards overcoming the above disadvantages or which at least provides the public with a useful choice.

BRIEF SUMMARY OF THE INVENTION

Accordingly in one aspect, the invention consists in an article support means a plurality of which are adapted to be spaced apart along an endless conveyor of an article grading apparatus; said support means comprising article receptable means, and mounting means, a connection being provided between said mounting means and said article receptable means to be positioned at an upper position at which said article rotating means is able to rotate an article, and a lower article carrying position, said article rotating means and the article rotating means of a next adjacent article support means on said endless conveyor being adapted to engage and rotate one or a selected number of articles positioned between them when each is in its said upper position and to enable only said one article or said selected number of said articles to remain in said article receptable means when said article rotating means is returned to its lower article carrying position.

In a second aspect the invention consists in a method of supplying a selected number of articles for grading by grading means, said method comprising the steps of:

(i) supplying said articles to a plurality of rotatable article receptable means mounted spaced apart on respective article support means on an endless conveyor;

(ii) vertically moving said article receptable means or a part thereof relative to said article support means; and (iii) rotating said article receptable means or said part thereof to remove any excess articles above said selected number from between adjacent article receptacle means to retain said selected number of articles in said article receptacle means.

In this specification various equivalent terms have been used with equivalences as indicated below:

article receptacle means: "cup"

conveyor engaging means: coupling means horizontal position holding means: corner recesses slidable guiding means: guiding surfaces article support means: "fruit cup", fruit carrier, carrier conveyor: chain

BRIEF DESCRIPTION OF THE DRAWINGS

The invention consists in the foregoing and also envisages constructions of which the following gives examples.

One preferred form of the present invention will now be described with reference to the accompanying drawings in which.

DESCRIPTION OF PREFERRED EMBODIMENTS

Figure 1:
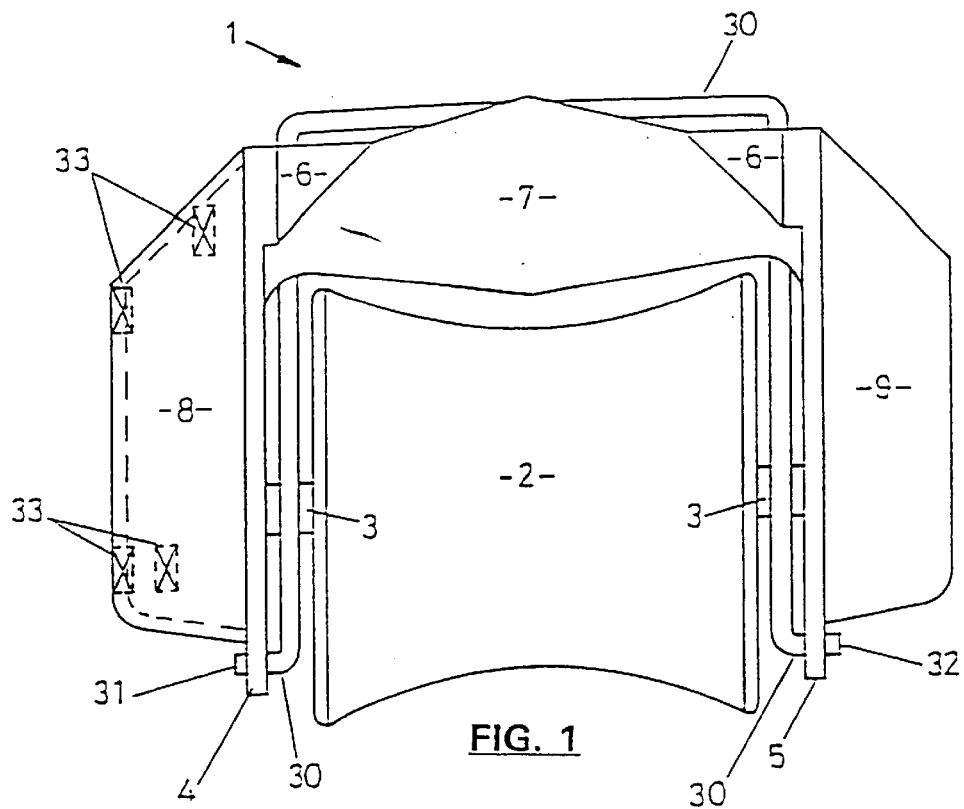
FIG. 1 is a plan elevation of the fruit cup of the present invention.

With reference to the drawings, FIG. 1 shows a carrier for supporting items of produce to be sorted/graded/packing generally referenced 1. A roller 2 which is preferably a bow tie roller has a shaft 3 connected at one end to arm member 4 and at its opposite end to arm member 5. Arm members 4 and 5 being joined at one end by connecting member 6 so that said arm members (4 and 5) and said connecting member 6 are arranged substantially in a U shaped yoke configuration which lies substantially in a horizontal plane when in use in the normal operating position. Connecting member 6 has formed therein a back plate 7 which is contoured to allow a substantially spherical or spheroidal object, such as an apple, to be supported in the region between back plate 7 and roller 2. Extending downwardly from connecting member 6 is shaped member 20 the function of which will be described later in this description. Extending wing 8 is attached to arm member 4 and extending wing 9 is attached to arm member 5. Extending wings 8 and 9 each having weight points 33 on their undersides.

The foregoing description of interconnected parts defines a first individual piece of the fruit carrier 1 which may be generally referred to as the article receptacle means.

Figure 2:
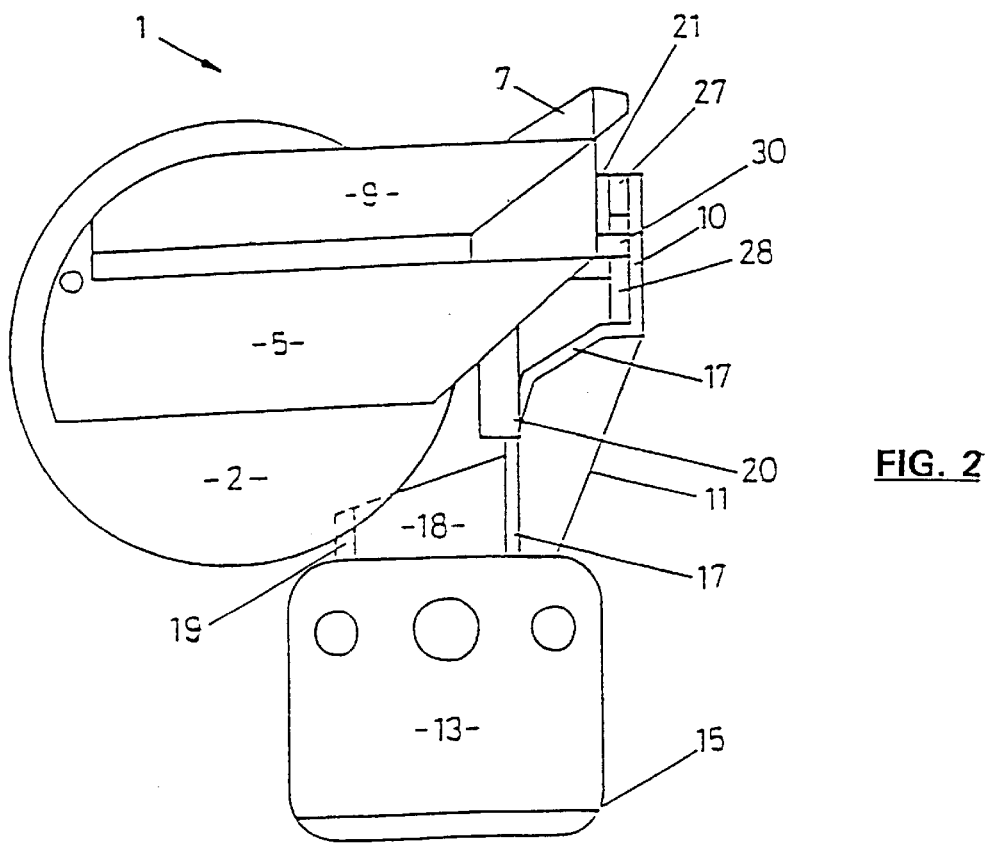
FIG. 2 is a side elevation of the fruit cup of FIG. 1.
Figure 3:
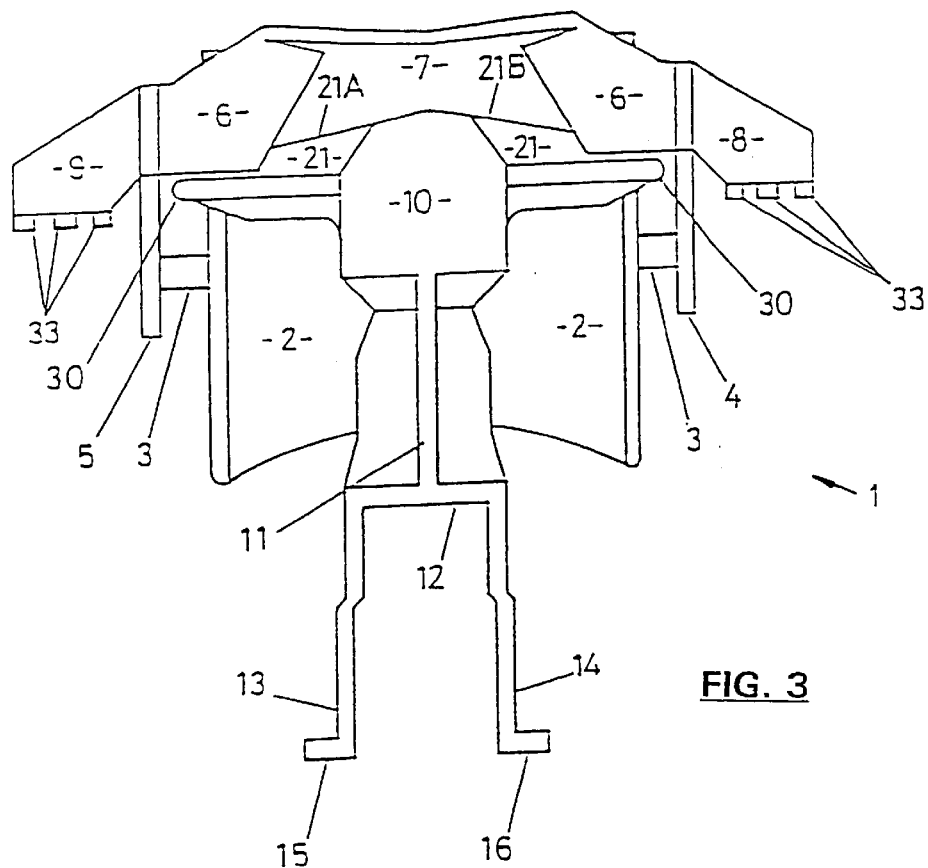
FIG. 3 is an end elevation of the fruit cup of FIG. 1.
Figure 5:
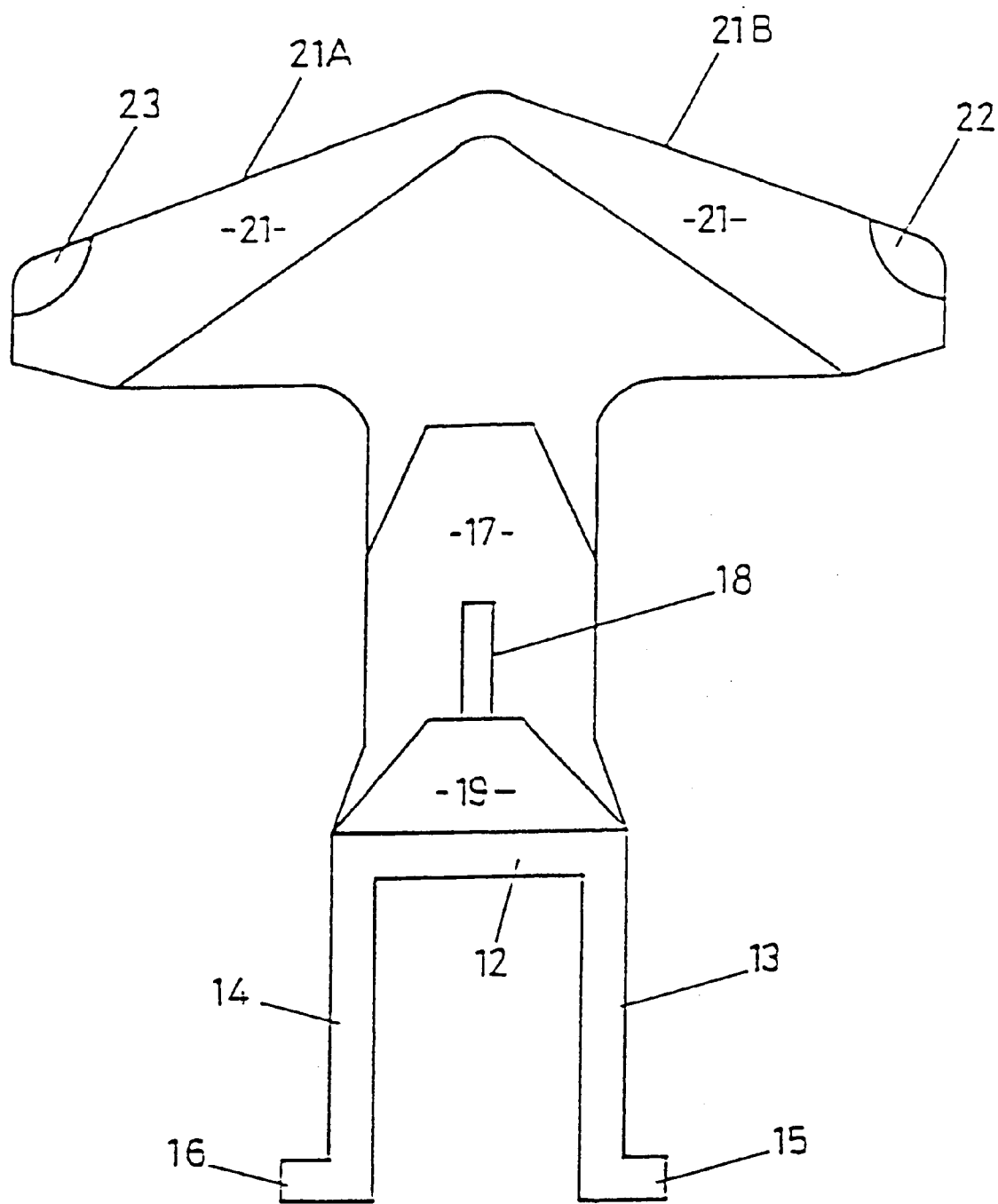
FIG. 5 is an elevation showing only the tri-state mounting means of the present invention.

With reference to FIGS. 2, 3 and 5 a second individual piece of the fruit carrier 1 will now be described which may be generally referred to as the dual sided tipping mounting means. A plate 10 is shown supporting rib 11 extending therefrom to a top wall 12 of a coupling means. The coupling means also includes side walls 13 and 14, each side wall having three circular holes formed therein. Side walls 13 and 14 extend from the top wall 12 to respective feet members 15 and 16. Extending symmetrically, perpendicularly from supporting rib 11 is shaped rib 17 which extends from plate 10 to intersect top wall 12 of the coupling means. Following in the plane of supporting rib 11 is thin bracing rib 18 which joins shaped rib 17 to governing member 19 which is as shown in FIG. 5 shaped as a trapezium. It can also be seen from FIG. 5 that shaped rib 17 has a substantially trapezium shaped head which in use is covered by previously described shaped member 20, shaped member 20 having therein a correspondingly shaped receiving region to allow shaped member 20 to partially cover the trapezium shaped head of shaped rib 17.

Figure 4:
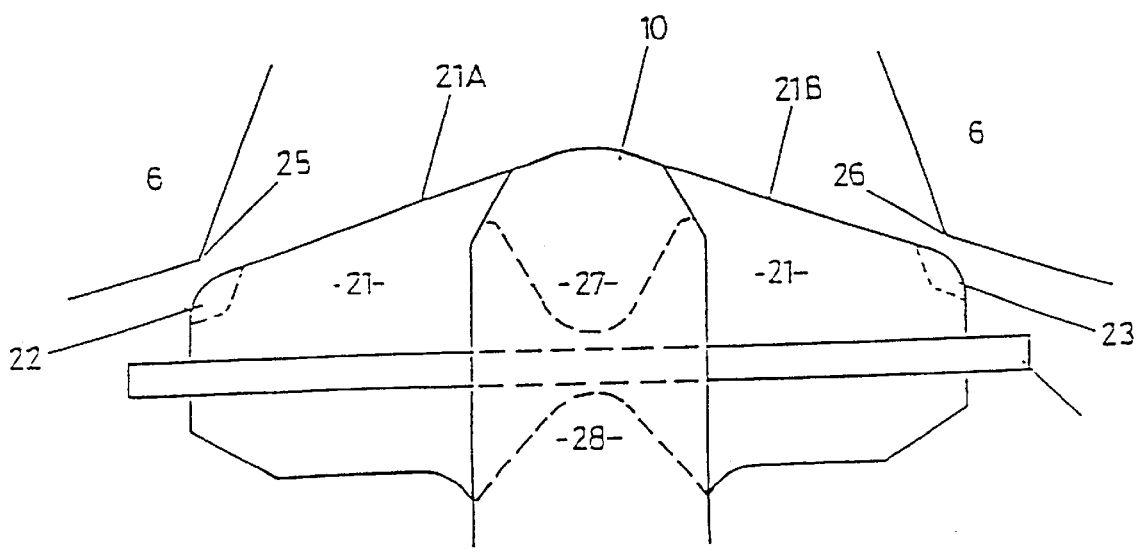
FIG. 4 is a detailed elevation of the guiding mechanism of the fruit cup of FIG. 1.

With reference now to FIG. 4, it can be seen that plate 10 is connected to member 21. Member 21 having corner recesses 22 and 23 provided to accept corners 25 and 26 respectively of connecting members 6. Member 21 also having moulded therein downward extending V shaped raised area 27 and upward extending V shaped raised area 28. V shaped areas 27 and 28 providing an open channel between plate 10 and member 21. Guiding surfaces 21A and 21B are also provided on member 21.

The previously described article receptacle means and just described dual sided tipping mounting means comprise two independent pieces of the present invention. These two pieces are connected together by pivot member 30 which may be seen in FIGS. 1, 3 and 4. Pivot member 30 is of a substantially U shape and is preferably constructed from a light yet strong metal or plastics material. Ends 31 and 32 of pivot member 30 pass through holes in arm members 4 and 5 respectively. Pivot member 30 is thus rotatable about an axis through said holes in arm members 4 and 5. The U shaped pivot member 30 is further passed through the open channel between V shaped areas 27 and 28 in member 21 and is free to move both in a plane parallel to the member 21 as well as being rotatable in that plane around the pivot formed by the intersection of upper extending V shaped area 28 in connecting member 6 and pivot member 30.

In use, the apparatus of the present invention is connected to a conveyor system which preferably comprises an endless chain. The present invention is attached to the chain by placing side walls 13 and 14 of the coupling means astride one link in the chain so that the holes in side walls 13 and 14 may be used to pass dowels which also pass through corresponding holes in the link. A series of carriers may be attached to the chain so as to build up an endless series. A number of adjacent chains may be used in a grading/sorting/packaging operation with each carrier being independently operable.

A controller, which may comprise a computer, controls the operation of the grading/sorting/packaging system, which could either include weighing or imaging to size the fruit. The normal operating position of the present invention is with pivot member 30 resting on upward extending V shaped area 28 with corners 25 and 26 of connecting member 6 sitting in recesses 22 and 23 respectively of member 21. With the conveyor system moving, produce (for example, fruit) are caused to enter the carriers. A section at the beginning of the conveyor system may be used as a "singulator" which has the purpose of ensuring that only one apple is carried by each carrier. This function may be carried out by causing roller 2 be raised and to rotate in a predetermined direction which has been found to have the desired effect of ejecting superfluous fruit. The fruit is at this stage supported between the rollers of consecutive carriers. The ejected fruit are then recycled or moved to a following empty cup.

In an imaging system, with the singulator section having ensured one piece of fruit per cup, a video camera could then be used to analyze the fruit The rollers 2 could then be rotated so that multiple views of the fruit could be taken, this is especially important for produce with a non-spherical shape.

Alternatively, in a weighing system, the cups are then passed over a weighing section which preferably comprises load cells used to determine the weights of each individual piece of fruit. In order to obtain this weight information whilst the fruit is still in the carrier, the extending arms 8 and 9 are guided onto a load sensing section where the article receptacle means are lifted from their resting place on the dual sided tipping mounting means by an upward force applied to weight points 33 below each of extending wings 8 and 9. The article receptacle means are pivotable in a vertical plane by the action of pivot member 30 against V shaped areas 27 and 28 and is able to substantially "float" in this vertical plane for weighing purposes. The article receptacle means is then substantially free from the effects of the conveyor system (that is free from vibration and the weight of the chain) and the contents of the cup may then be weighed.

With the individual pieces of fruit having been weighed, the control system controlling the operation then decides where each piece is to be sent so that each piece may be ejected from the cup at the desired place along the conveyor. This is accomplished by providing an upward tipping force to the underside of either of extending wings 8 or 9 (depending which direction the carrier is to be tipped). This force is applied, for example, by computer controlled solenoid rams. The fruit is ejected to the side opposite that which the upward tipping force was applied, perpendicular to the direction of travel. It has been found that the design of the present invention has resulted in stability in its normal operating position. Upon entry to the carrier the fruit may exert forces upon any surface of the carrier without causing tipping, while only a small upwards tipping force is required to tip the carrier. Extending wings 8 or 9 guide the contents from the carrier, reducing bruising in the case of sensitive contents.

When the carrier is tipped, corners 25 or 26 (depending on the direction of tipping) are caused to slip from their temporarily stable positions in recesses 22 and 23 respectively along guiding surfaces 21A or 21B. The loose coupling between shaped rib 17 and shaped member 6 slips upon tipping and pivot member 30 slides and rotates in the plane of plate 10 in response to the weight of the article receptacle means moving position. This sliding action means that the contents of the carrier are shifted sideways rather than being dropped. The carrier is restrained to only tip as far as governing member 19 will allow before roller 2 contacts governing member 19. The carrier is returned to its upright position once the conveyor system returns the carrier to the point where they are filled. Usually this is accomplished by a section wherein the carrier is transported upside down. Upon returning to their upright positions, the cups may be guided so that the article receptacle means once again sits in its temporary stable position on the dual sided tipping mounting means as previously described.

The present invention, by having the ability to tip the contents to either side of the conveyor system is expected to increase the efficiency of grading/packing/sorting lines by allowing greater flexibility. Also, the present invention is compatible with both imaging systems (because the roller rotates the fruit to give multiple views) and weighing systems (because the carrier is stable with minimum external forces). By unloading to both sides of a conveyor, it is possible to have more unloading points in a given length of conveyor. As the contents of the carriers of the present invention are shifted sideways rather than being "kicked" or dropped, improvements in fruit quality are expected as well as less wastage, formerly due to rough handling. The present invention is designed for use with many currently installed systems and so should be easily accepted without major conversions required. Also, the present invention, by incorporating a rotatable roller does away with the need to provide a section of conveyor to be used as a "singulator".

What is claimed is:

1. An article support means comprising article receptacle means, and mounting means securable to an endless conveyor to space apart the article support means, a connection being provided between said mounting means and said article receptacle means enabling an article rotating means forming part of said article receptacle means to be positioned at an upper position at which said article rotating means is able to rotate an article, and a lower article carrying position, said article rotating means and the article rotating means of a next adjacent article support means on said endless conveyor engage and rotate one or a selected number of articles positioned between them when each is in its said upper position and to enable only said one article or said selected number of said articles to remain in said article receptacle means when said article rotating means is returned to its lower article carrying position.

2. An article support means as claimed in claim 1 wherein said connection between said mounting means and said article receptacle means is pivotal.

3. An article support means as claimed in claim 2 wherein said article rotating means comprises a roller means rotatably mounted on a shaft extending substantially transversely of said article receptacle means.

4. An article support means as claimed in claim 3 wherein said article receptacle means includes an upwardly facing article retaining portion spaced apart from said article rotating means.

5. An article support means as claimed in claim 4 wherein said upwardly facing article retaining portion extends transversely of said article receptacle means substantially parallel with said article rotating means and spaced rearwardly thereof.

6. An article support means as claimed in claim 5 wherein said article retaining portion comprises a plate having a contoured surface to allow said one or said selected number of articles, the or each of which comprising a substantially spherical or spheroidal object, to be supported between said plate and said article rotating means.

7. An article support means as claimed in claim 1 wherein said article receptacle means includes a pair of arms between which said article rotating means is rotatably mounted; said pair of arms extend to a rear portion of said article receptacle means which is pivotally mounted relative to said mounting means; and a pivotal means connects an outer end of each of said arms with said mounting means.

8. An article support means as claimed in claim 6 wherein said pivotal means comprises a substantially U-shaped member having free ends which connect with a respective said arm and a transverse portion which pivotally connects with said mounting means; and said transverse portion of said pivotal means extends through an aperture provided in said mounting means; and said aperture is provided as a transverse channel in said mounting means.

9. An article support means as claimed in claim 8 wherein said transverse channel includes a pivot portion about which said pivotal means can pivot and said pivot portion includes a V-shaped area extending into said channel.

10. An article support means as claimed in claim 1 wherein said article receptacle means is normally supported by said mounting means in a substantially horizontal plane with first engagement means provided for said mounting means engageable with second engagement means provided for said article receptacle means acting to support said article receptacle means in said horizontal plane.

11. An endless conveyor article grading apparatus including a plurality of spaced apart article support means as claimed in claim 1 each connected by respective conveyor engaging means with an endless conveyor and including a control means which acts to change the relative vertical position of, and rotate, said article rotating means in rotating one or a selected number of articles supported between said adjacent article rotating means to result in only said one or said selected number of articles being retained by said article rotating means once it is returned to its article carrying position.

12. An endless conveyor article grading apparatus as claimed in claim 11 and including weighing means adapted to engage with and pivot said article receptacle means relative to said mounting means in weighing the one or more articles carried by said article receptacle means.

13. An endless conveyor article grading apparatus as claimed in claim 12 and including an imaging means to analyse said one or said selected number of articles when raised and rotated.

14. An endless conveyor article grading apparatus as claimed in claim 13 wherein said article carrying position is also an article weighing position.

15. A method of supplying a selected number of articles for grading by grading means, said method comprising the steps of:
  (i) supplying said articles to a plurality of rotatable article receptacle means mounted spaced apart on respective article support means on an endless conveyor;
  (ii) vertically moving said article receptacle means or a part thereof relative to said article support means; and
  (iii) rotating said article receptacle means or said part thereof to remove any excess articles above said selected number from between adjacent article receptacle means to retain said selected number of articles in said article receptacle means.

16. A method as claimed in claim 15 wherein said method includes the step of lowering said article receptacle means or said part thereof after the step of rotating said article receptacle means in order that said article receptacle means are provided with said selected number of articles.

17. An article support for a produce grading apparatus comprising:
  an article receptacle;
  a means for mounting the receptacle securably to an endless conveyor;
  a pivot member connecting the mounting means and the article receptacle; and
  a roller forming part of the article receptacle for rotating an article;
wherein the article receptacle positioned at an upper article carrying position at which the roller is able to rotate the article, and wherein the article receptacle and the roller of a next adjacent article support on the endless conveyor engage and rotate the article or a selected number of articles positioned between them when each is in its upper position and enable only the article or a selected number of articles to remain in the article receptacle when the roller is returned to its lower article carrying position.

18. An article support as claimed in claim 17 wherein the article receptacle comprises a pair of arms between which the roller is rotatably mounted, the pair of arms extending to a rear portion of the article receptacle which is pivotally mounted relative to the mounting means and the pivot member connects an outer end of each arm with the mounting means.

19. An article support as claimed in claim 17 wherein the pivot member comprises a substantially U-shaped member having free ends which connect with a respective arm and a transverse portion which pivotally connects with the mounting member and wherein the transverse portion of the pivot member extends through an aperture in the mounting means, the aperture providing a transverse channel in the mounting means.

* * * * *